United States Patent

Ruigrok

Patent Number: 5,973,889
Date of Patent: Oct. 26, 1999

[54] SINGLE-CHANNEL MAGNETIC HEAD WITH MAGNETORESISTIVE ELEMENT IN SERIES WITH ELECTRICALLY CONDUCTING MAGNETIC ELEMENTS

[75] Inventor: Jacobus J. M. Ruigrok, Eindhoven, Netherlands

[73] Assignee: U.S. Philips Corporation, New York, N.Y.

[21] Appl. No.: 09/008,338

[22] Filed: Jan. 16, 1998

[30] Foreign Application Priority Data

Feb. 20, 1997 [EP] European Pat. Off. ............ 97200486

[51] Int. Cl.⁶ ...................................... G11B 5/39
[52] U.S. Cl. .......................................... 360/113
[58] Field of Search ............................... 360/113, 126

[56] References Cited

U.S. PATENT DOCUMENTS

| | | | |
|---|---|---|---|
| 4,686,472 | 8/1987 | Van Ooijen et al. | 324/252 |
| 5,193,039 | 3/1993 | Smith et al. | 360/113 |
| 5,446,613 | 8/1995 | Rottmayer | 360/113 |
| 5,493,467 | 2/1996 | Cain et al. | 360/113 |
| 5,515,221 | 5/1996 | Gill et al. | 360/113 |
| 5,627,704 | 5/1997 | Lederman et al. | 360/113 |
| 5,668,688 | 9/1997 | Dykes et al. | 360/113 |
| 5,726,837 | 3/1998 | Nakatani et al. | 360/113 |
| 5,729,410 | 3/1998 | Fontana, Jr. et al. | 360/113 |
| 5,872,691 | 2/1999 | Fukuyama et al. | 360/113 |

FOREIGN PATENT DOCUMENTS

| | | |
|---|---|---|
| 0457278A2 | 11/1991 | European Pat. Off. . |
| 0617409A2 | 9/1994 | European Pat. Off. . |
| 0617410A2 | 9/1994 | European Pat. Off. . |
| WO9607926 | 3/1996 | WIPO . |

*Primary Examiner*—Jefferson Evans
*Attorney, Agent, or Firm*—David R. Treacy

[57] ABSTRACT

Single-channel magnetic head having a head face (1) which extends in a first direction (I) in which a magnetic record carrier (3) is relatively movable with respect to the magnetic head, and in a second direction (II) transverse to the first direction. The magnetic head has a structure of layers which, viewed in the first direction, are situated one on top of the other and extend substantially in the second direction and a third direction (III) transverse to the first and the second direction. The structure is provided with a magnetoresistive measuring element (5), a first magnetic element (7) and a second magnetic element (9). Both magnetic elements are electrically conducting, while the measuring element is arranged electrically in series between the two magnetic elements for passing a measuring current (i) through the measuring element substantially in the third direction. Each magnetic element has an electric contact face (7a, 9a). To obtain a stable single-channel magnetic head having a narrow, well-defined scanning width, at least one magnetic element extending as far as the head face has an extensiveness which is larger in the second direction than in the third direction. This extensiveness in the second direction is also larger than the effective width (w) of the measuring element. In the third direction, the relevant magnetic element has a larger relative magnetic permeability ($\mu_{rIII}$) than in the second direction.

13 Claims, 5 Drawing Sheets

SINGLE-CHANNEL MAGNETIC HEAD WITH MAGNETORESISTIVE ELEMENT IN SERIES WITH ELECTRICALLY CONDUCTING MAGNETIC ELEMENTS

BACKGROUND OF THE INVENTION

The invention relates to a single-channel magnetic head having a head face which extends in a first direction in which a magnetic record carrier is relatively movable with respect to the magnetic head, and in a second direction transverse to the first direction, and having a structure of layers which, viewed in the first direction, are situated one on top of the other and extend substantially in the second direction and a third direction transverse to the first and the second direction. This structure is provided with a magnetoresistive measuring element having an effective width extending in the second direction, a first magnetic element and a second magnetic element viewed; in the first direction, said magnetic elements are situated in an at least partially overlapping relationship, at least the first magnetic element of said elements extends as far as the head face and both magnetic elements are electrically conducting. The measuring element are arranged electrically in series between the two magnetic elements for passing a measuring current through the measuring element substantially in the third direction, and each magnetic element has an electric connection face.

A magnetic head of this type is known from U.S. Pat. No. 5,493,467. The known magnetic head has a spin-valve magnetoresistive sensor which is incorporated in a magnetic yoke. Two yoke parts of the yoke are electrically interconnected at a head face of the magnetic head by means of an electrically conducting gap layer, while one of the yoke parts is provided with an interruption which is electrically and magnetically bridged by the sensor. Each yoke part is provided in an area spaced apart from the head face with electrically conducting layers oriented transversely to the yoke parts, which layers terminate in connection faces situated beside the yoke parts. The sensor has an effective portion within which changes of magnetization are detected during scanning. Although a relatively narrow read channel can be realized with the known magnetic head, this head does not have an optimal stability, which is due to the yoke configuration used. This is particularly the case with a small yoke width because then there is a clear risk that the yoke parts are split up into magnetic domains so that instabilities and Barkhausen noise occur.

OBJECTS AND SUMMARY OF THE INVENTION

It is an object of the invention to provide a stable single-channel magnetic head having a relatively narrow, well-defined scanning width.

The single-channel magnetic head according to the invention is characterized in that a magnetic element extending as far as the head face has an extensiveness which is larger in the second direction than in the third direction, said extensiveness in the second direction being larger than the effective width of the measuring element, while the magnetic element extending as far as the head face a relative magnetic permeability which is larger in the third direction than in the second direction. The element extending as far as the head face may be the first magnetic element. By using a relatively wide first magnetic element, a favorable shape-anisotropy is obtained so that there is a small risk that this element is split up into magnetic domains. Closure domains which may be present in the magnetic element extending outside the measuring element in the second direction are beyond or substantially beyond the influence of the measuring element. Consequently, they have no influence or hardly any negative influence on the noise in the output signal. The use of an anisotropic material having a relatively high permeability in a direction transverse to the head face leads to an accurately defined read channel. Said measures thus result in a great stability of the read signal, a small risk of Barkhausen noise and a well-defined read or scanning width.

The magnetic head according to the invention has a favorable signal-to-noise ratio which, to a considerable extent, is the result of the great magnetic stability of the wide magnetic element provided. In a practical embodiment, this element has an extensiveness in the second direction which is at least twice larger than in the third direction.

It has been found that a well defined read channel can be realized already at a relative magnetic permeability in the third direction, which is higher than 25 times the relative magnetic permeability in the second direction.

The single-channel magnetic head according to the invention is preferably a thin-film magnetic head, in which a thin-film structure is provided on a substrate. The magnetic elements are thin films formed from, for example NiFe, CoNbZr, or FeNbSi—N. One of the magnetic elements may be alternatively formed by the substrate.

An anisotropic magnetoresistive (AMR) element or a giant magnetoresistive (GMR) element may be used as a measuring element. An AMR element may be formed, for example by a layer of an NiFe alloy with or without a known barberpole structure of conducting strips. A favorable implementation of the AMR element is a laminated magnetoresistive element of the type as shown in U.S. Pat. No. 4,686,472 (herein incorporated by reference). A favorable GMR element is described in, for example WO-A 96/07926 (PHN 14.992; herein incorporated by reference). An AMR element may be biased by using a DC current-conveying conductor which is preferably placed between the magnetic elements. A GMR element of, for example, the spin-valve type has the advantage that biasing is not absolutely necessary.

The single-channel magnetic head according to the invention is suitable for scanning magnetic media having narrow tracks which are closely or not closely spaced and are used in, for example tape streamers, digital video systems, hard-disk drives and multimedia systems.

An embodiment of the single-channel magnetic head according to the invention is characterized in that an electrically conducting third magnetic element extending as far as the head face is provided, which, jointly with the second magnetic element not extending as far as the head face, bounds a non-magnetic space which is bridged by the magnetoresistive measuring element which, beside said space, is in electrical contact with the second and the third magnetic elements, an electrically conducting gap layer electrically interconnecting the first magnetic element and the third magnetic element extending proximate to the head face. In this magnetic head, which is of the yoke type, the magnetic elements are used for supplying and returning magnetic flux to and from the measuring element. The magnetic elements are therefore current-conveying flux guides during operation.

Jointly or not jointly with the first and/or second magnetic element, the third magnetic element extending as far as the head face has a larger extensiveness in the second direction than in the third direction, said extensiveness in the second direction being larger than the effective width of the magnetoresistive measuring element. This measure also leads to an improved stability with less Barkhausen noise. Moreover, the third magnetic element has a relative magnetic permeability which is preferably larger in the third direction than in the second direction. This is favorable for a well-defined read width. The gap layer is, for example a metal layer preferably composed of gold or copper.

An embodiment of the single-channel magnetic head according to the invention is characterized in that the magnetoresistive measuring element as well as the second magnetic element extend as far as the head face, while a part of the measuring element situated proximate to the head face is in electrical contact with the first magnetic element or the second magnetic element, and a part of the measuring element spaced apart from the head face is in electrical contact with the other one of the afore-mentioned magnetic elements. In this magnetic head, which is of the shielded type, the magnetic elements are used for electrically conducting measuring currents and for magnetically shielding the measuring element. The first and second magnetic elements are therefore current-conveying shields in operation.

Jointly or not jointly with the first magnetic element, the second magnetic element extending as far as the head face has a larger extensiveness in the second direction than in the third direction, which extensiveness in the second direction is larger than the effective width of the magnetoresistive measuring element. An advantage of this measure is again an improved stability with less Barkhausen noise. Moreover, the second magnetic element has a relative magnetic permeability which is preferably larger in the third direction than in the second direction. This is favorable for a well-defined scanning width. The measuring element may be in direct contact with the magnetic elements, or may be in contact with the magnetic elements via an electrically conducting intermediate layer, for example a metal layer.

It is to be noted that a magnetic head of the shielded type is known from EP-A 0 457 278. The known magnetic head is a thin-film magnetic head with a shielded MR element. The magnetic head is provided with a lower and an upper shielding magnetic layer, between which layers the MR element extends. A part of the MR element adjoining the head face of the magnetic head and a part spaced apart from the head face are each provided with an electrode. The electrode on the head face is electrically connected to the upper shielding layer via an electrically conducting layer, which shielding layer is grounded via an electric wire, while the electrode spaced apart from the head face is electrically connected to the input of an amplifier unit via an electric wire.

An embodiment of the single-channel magnetic head according to the invention is characterized in that the connection faces of the first and second magnetic elements are situated within a zone having an extensiveness in the second direction which is determined by the extensiveness in the second direction of the magnetic element extending as far as the head face. In this embodiment, the wafer surface area is efficiently used during manufacture.

An embodiment of the single-channel magnetic head according to the invention is characterized in that the connection faces of the first and second magnetic elements are situated on the relevant elements. In this embodiment, the realization of the connection faces, which are mutually offset in the third direction, requires only a small number of processing steps.

The invention also relates to a device for scanning a record carrier such as a magnetic tape or a magnetic disc, which device is provided with the magnetic head according to the invention.

These and other aspects of the invention are apparent from and will be elucidated with reference to the embodiments described hereinafter.

DESCRIPTION OF THE PREFERRED EMBODIMENTS

Figure 1:
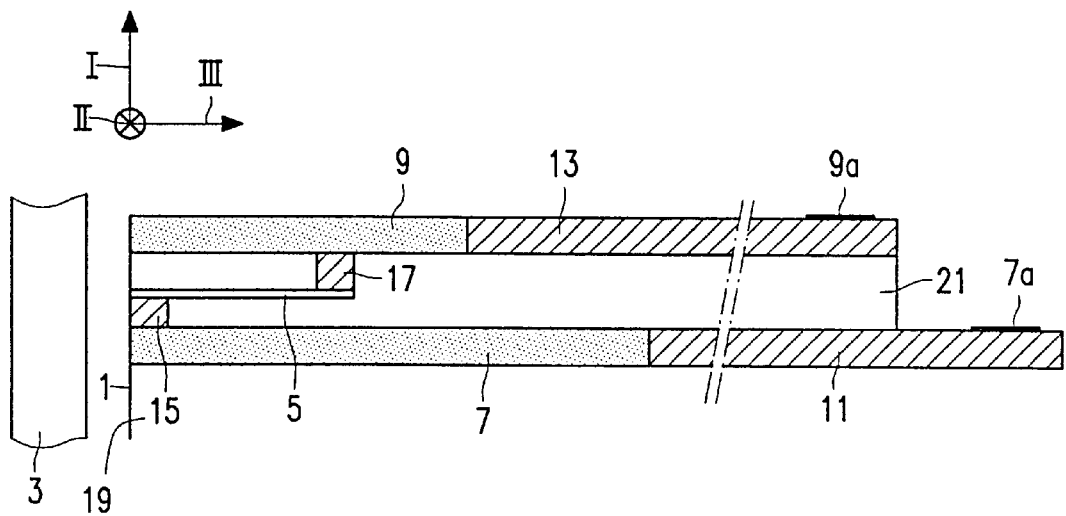
FIG. 1 is a diagrammatic cross-section of a first embodiment of the magnetic head according to the invention.
Figure 2:
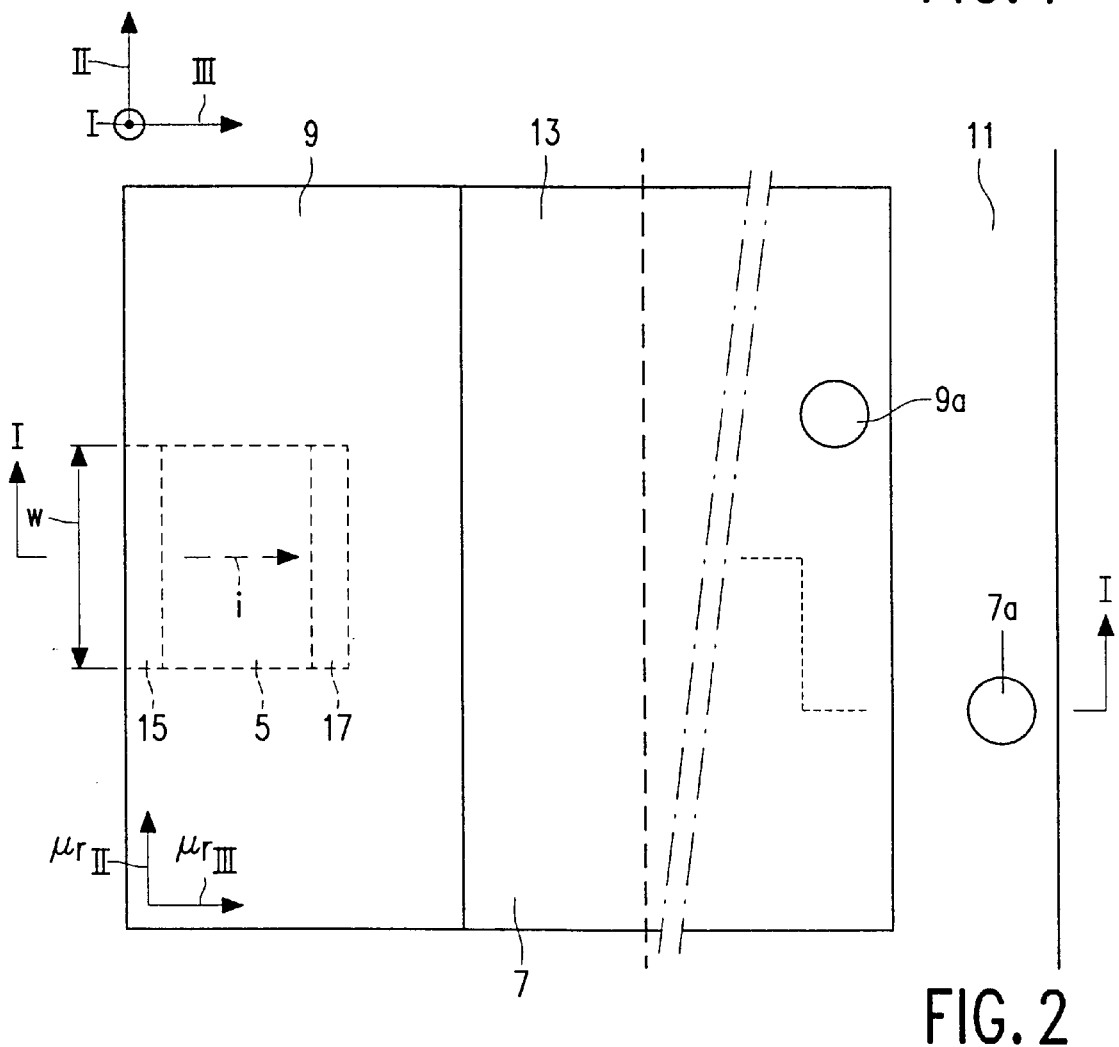
FIG. 2 is a diagrammatic plan view of the first embodiment.

The single-channel magnetic head according to the invention, shown in FIGS. 1 and 2, is of the shielded type. The cross-section shown in FIG. 1 is taken on the line I—I in FIG. 2. The magnetic head has a head face 1 for cooperation with a magnetic record carrier 3, a magnetic tape in this embodiment. The head face 1 extends in a first direction I in which the record carrier 3 is movable, and a second direction II which is transverse to the first direction. The magnetic head comprises a thin-film structure with layers situated one on top of the other, as viewed in the first direction I. These layers substantially extend in the second direction II and in a third direction III transverse to the first and the second direction. The thin-film structure is provided with a magnetoresistive measuring element 5 having an effective width w extending in the second direction. The measuring element 5 may be a GMR element or an AMR element. The structure is also provided with two electrically conducting, magnetically permeable layers of, for example NiFe, further referred to as first magnetic element 7 and second magnetic element 9. The magnetic elements 7 and 9 and the measuring element 5 situated in between these elements extend as far as the head face 1. The magnetic elements 7 and 9, which also function as magnetic shields in this embodiment, each have an electric connection face 7a, 9a, respectively, for establishing an electric connection with a current source. The connection faces 7a and 9a are situated on an electrically conducting layer 11, 13, respectively, for example a gold layer. These layers 11 and 13 are formed by means of known deposition and planarization methods and are connected in an electrically conducting manner to the first magnetic element 7 and the second magnetic element 9, respectively. The thin-film structure which is present may be realized by means of known techniques, starting from a non-magnetic substrate 19 of, for example $Al_2O_3$/TiC. Insulation layers of, for example $SiO_2$ or $Al_2O_3$ are situated between various magnetic and/or electrically conducting layers. In FIG. 1, these layers are jointly denoted by the reference numeral 21.

Known deposition, structuring and planarization methods are described in, for example EP-A 0 617 409 and EP-A 0 617 410 (PHN 14.428 and 14.429, respectively, both herein incorporated by reference). The measuring element 5 is electrically arranged in series between the two magnetic elements 7 and 9 by means of two electrically conducting intermediate layers 15 and 17, for example metal layers of gold or copper, the electrically conducting layer 15 being situated on the head face 1 and electrically connecting the measuring element 5 to the first magnetic element 7, and the electrically conducting layer 17 being spaced apart from the head face 1 and connecting the measuring element 5 to the second magnetic element 9. Due to this structure, a measuring current i is passed during operation through the measuring element 5 in the third direction III. The current direction shown in FIG. 2 may of course also be rotated 180°.

For biasing the magnetoresistive measuring element 5, the conducting intermediate layer 17 spaced apart from the head face 1 may be constituted by a conducting layer of an electrically conducting antiferromagnetic material such as an FeMn alloy, or by an electrically conducting hard-magnetic material such as a CoPt alloy.

In the embodiment shown, both magnetic elements 7 and 9 have a larger dimension in the second direction than in the third direction, the ratio between the two dimensions for the second magnetic element 9 being more than a factor of 2. Said dimension in the second direction is also larger than the effective width w of the measuring element 5, so that both elements 7 and 9 extend at both sides of the measuring element 5. In this embodiment, both magnetic elements 7 and 9 have a relative magnetic permeability which is larger in the third direction than in the second direction. The relative permeability $\mu_{rIII}$ in the third direction is a factor of 25 or more larger than the relative permeability $\mu_{rII}$ in the second direction.

As is apparent from FIG. 2, the connection faces 7a and 9a are situated within a zone having an extensiveness in the second direction which is determined by the extensiveness in the second direction of the magnetic elements 7 and 9, respectively.

To avoid unnecessary repetition, the following descriptions of further embodiments will mainly be limited to characteristic features differing from the embodiment already described. The introduced directions I, II and III are applicable to all embodiments.

Figure 3:
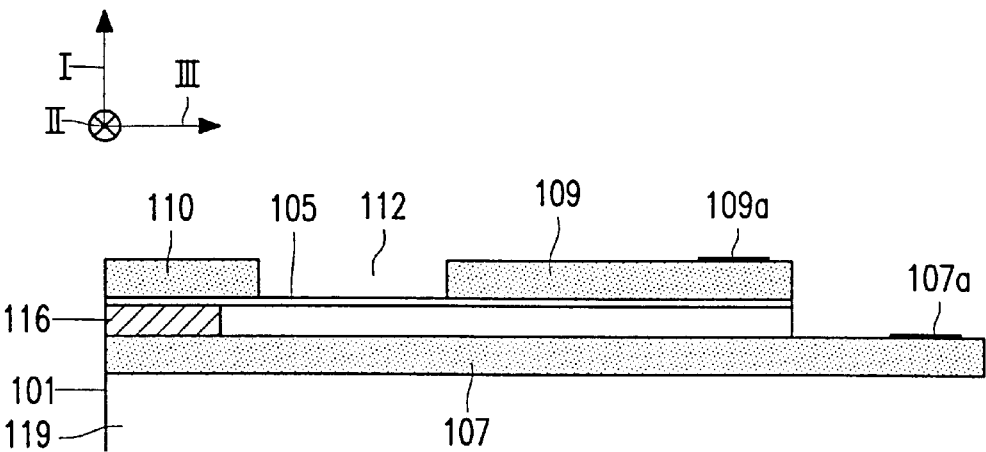
FIG. 3 is a diagrammatic cross-section of a second embodiment.
Figure 4:
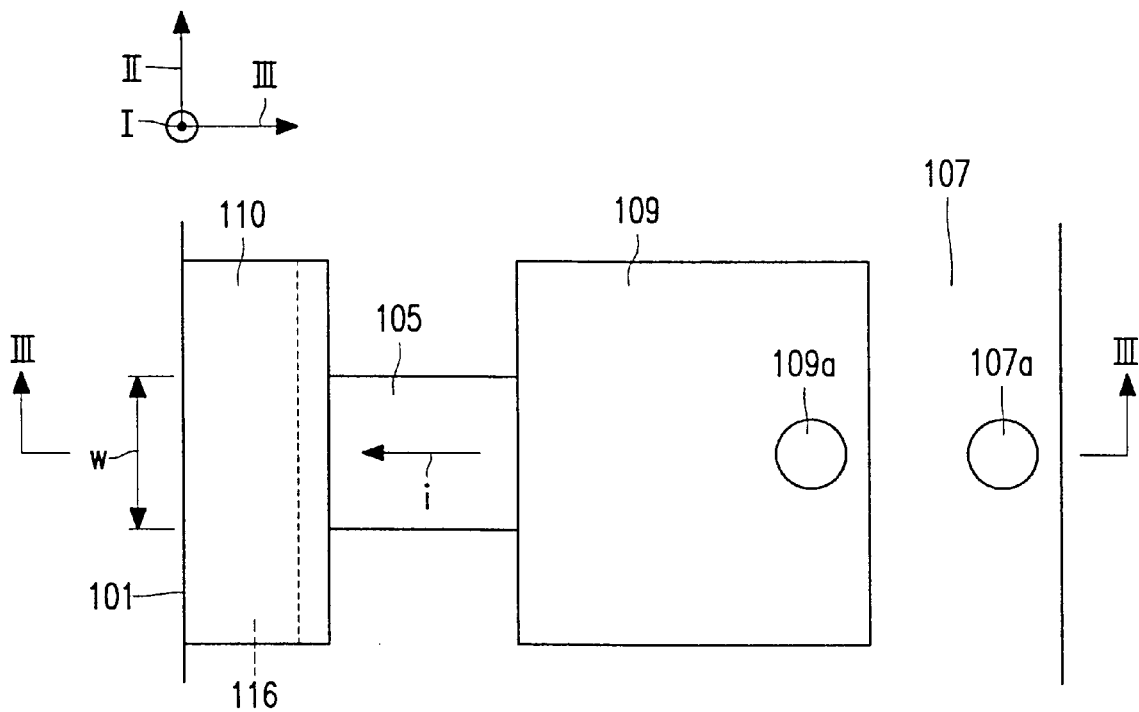
FIG. 4 is a diagrammatic plan view of the second embodiment.

The single-channel magnetic head according to the invention, shown in FIGS. 3 and 4, has a non-magnetic substrate 119 which is provided with a thin-film structure. The cross-section shown in FIG. 3 is taken on the line III—III in FIG. 4. The thin-film structure has two electrically conducting, magnetically permeable layers of, for example CoNbZr, one layer of which constitutes a first magnetic element 107 and the other layer constitutes a second and a third magnetic element 109, 110, respectively. A non-magnetic permeable space 112 is present between the second and the third magnetic elements. The structure is further provided with a magnetoresistive measuring element 105 of, for example, the GMR type which bridges the space 112. The magnetic head shown has a head face 101 adjoining the magnetic elements 107 and 110. A gap layer 116 of an electrically conducting material such as gold or copper, situated proximate to the head face 101 and forming part of the thin-film structure, electrically connects the first magnetic element 107 to the measuring element 105, which measuring element 105 itself constitutes a common electrical contact with the second magnetic element 109, so that the measuring element 105 is electrically arranged in series between the magnetic elements 107 and 109. An electric connection face 107a, 109a for connection to a measuring source is situated on the two last-mentioned elements 107 and 109, respectively. During operation, the first magnetic element 107 and the third magnetic element 109 thus convey a current, the current through the measuring element 105 having a direction i transverse to the head face 101. In this embodiment, the third magnetic element 110 has an extensiveness in the second direction which is larger than the effective width w of the measuring element 105 and is at least twice larger than the extensiveness of the third element 110 in the third direction. The first magnetic element 107 preferably has such a large extensiveness in the second direction II that possibly present domain walls in the element 107 are relatively far remote from the measuring element 105, so that possible domain wall displacements do not have any influence or only a slight influence on the output signal.

Figure 5:
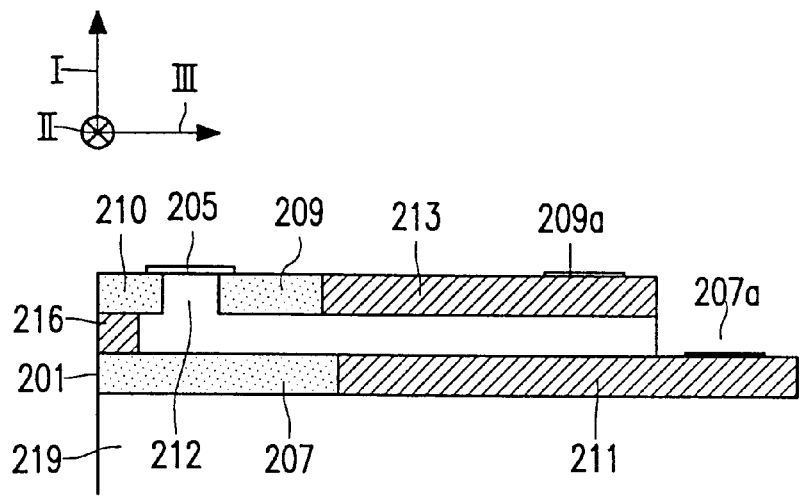
FIG. 5 is a diagrammatic cross-section of a third embodiment.
Figure 6:
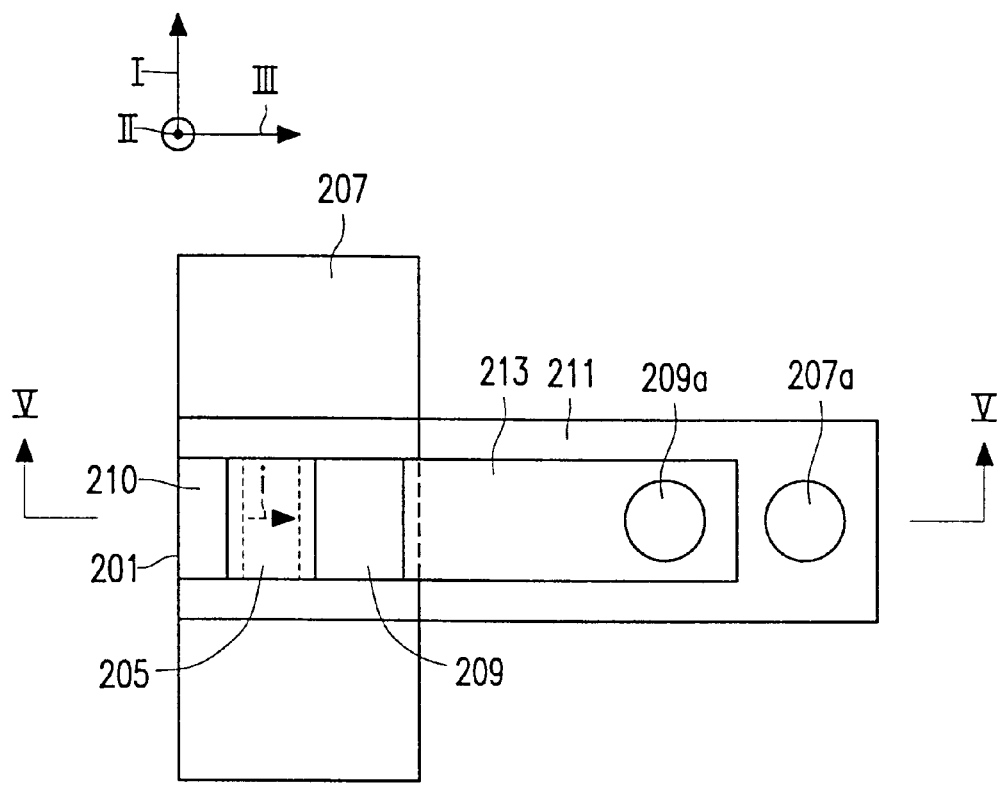
FIG. 6 is a diagrammatic plan view of the third embodiment.

The single-channel magnetic head according to the invention, shown in FIGS. 5 and 6, comprises a film structure provided on a non-magnetic substrate 219, with a magnetoresistive measuring element 205, a first magnetic element 207, a second magnetic element 209 and a third magnetic element 210. The cross-section shown in FIG. 5 is taken on the line V—V in FIG. 6. The magnetic head, which is of the yoke type, has a head face 201 in which the magnetic elements 207 and 210 terminate. The measuring element 205 bridges a non-magnetic space 212 between the second magnetic element 209 and the third magnetic element 210. All of the three mentioned magnetic elements 207, 209 and 210 are formed from an electrically conducting, magnetically permeable material such as FeNbSi—N and have the greatest magnetic permeability in the third direction. An electrically conducting, non-magnetic gap layer 216 situated proximate to the head face 201 functions as an electric contact layer between the first magnetic element 207 and the third magnetic element 210. Since the measuring element 205 is both in electrical contact with the second magnetic element 209 and the third magnetic element 210, the measuring element 205 is electrically arranged between the first magnetic element 207 and the second magnetic element 209. The last-mentioned elements 207 and 209 are provided with electric connection faces 207a and 209a, respectively. The connection faces 207a and 209a are present on electrically conducting layers 211 and 213 of the film structure extending in alignment with the elements 207 and 209, as viewed in the third direction III. In the second direction II, the first magnetic element 207 has a dimension which is at least a factor of 2 larger than in the third direction III, which dimension is also larger than the dimension of the measuring element 205 in the second direction.

FIGS. 7 to 10 show variants of the embodiments already shown, in which the magnetic elements shown in the variants have properties and dimensions corresponding to those of the magnetic elements already shown. In view of the close relationship with the embodiments already shown, the plan views of these variants are not shown.

Figure 7:
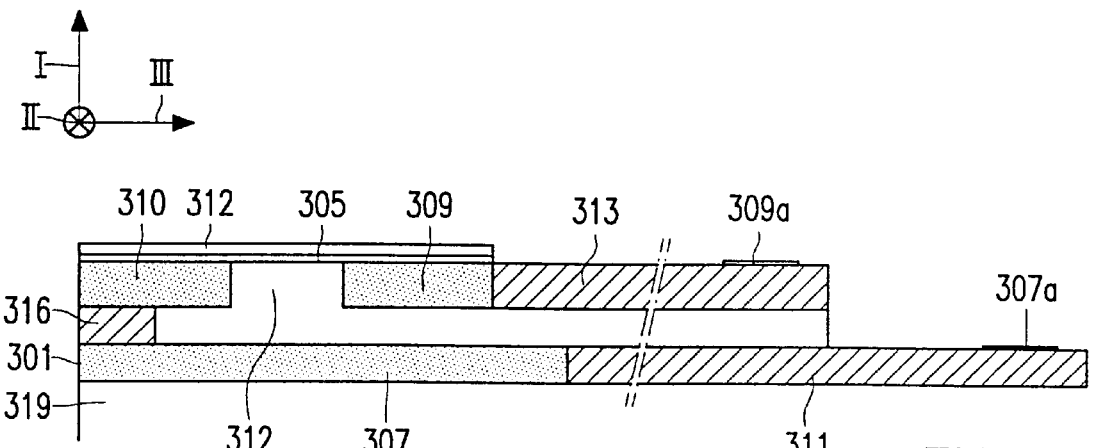
FIG. 7 is a diagrammatic cross-section of a fourth embodiment.

The single-channel magnetic head according to the invention, shown in FIG. 7, has a head face 301 and a non-magnetic substrate 319 provided with a layer structure with a magnetic yoke comprising a first magnetic element 307, a second magnetic element 309, a third magnetic element 310 and a magnetoresistive measuring element 305. The magnetic elements 307, 309 and 310 are formed from soft-magnetic layers of an electrically conducting material. The measuring element 305 is an AMR element. The measuring element 305 electrically engages the magnetic elements 309 and 310, thus forming an electric contact and bridging a non-magnetic, non-electrically conducting space or gap 312 between the elements 309 and 310. A non-magnetic, electrically conducting gap layer 316, which electrically interconnects the magnetic elements 307 and 310, is situated on the head face 301. The magnetic elements 307 and 309 have a connections faces 307a, 309a, respectively, which are present on conducting, non-magnetic layers 311 and 313 electrically connected to the magnetic elements 307 and 309, so that an electric circuit comprising the measuring element 305 and the magnetic elements 307, 309 and 310 is formed between the connection faces 307a and 309a. For biasing the measuring element 305, a layer 312 of an antiferromagnetic material such as NiOx is provided on the measuring element 305.

Figure 8:
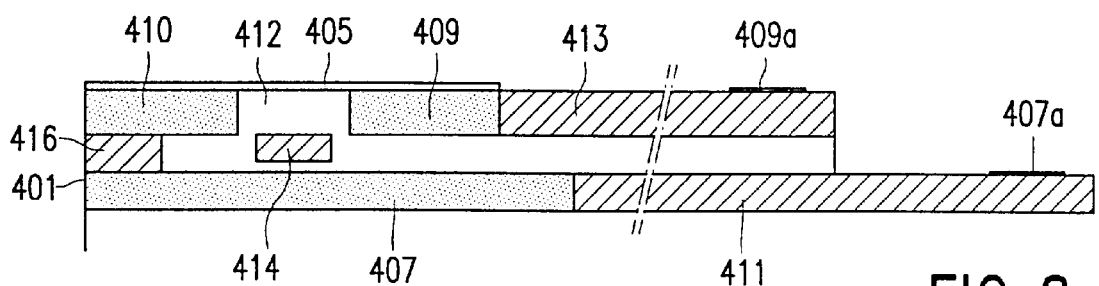
FIG. 8 is a diagrammatic cross-section of a fifth embodiment.

The single-channel magnetic head according to the invention, shown in FIG. 8, is of the yoke type and comprises a magnetoresistive measuring element 405 which, similarly as described with reference to FIG. 7, is incorporated in a current circuit with a first magnetic element 407, a second magnetic element 409 and a third magnetic element 410. An electrically conducting gap layer 416 is situated on a head face 401. The magnetic elements 407 and 409 have connection faces 407a and 409a, respectively. An electrically conducting bias winding 414 is provided for biasing the measuring element 405.

Figure 9:
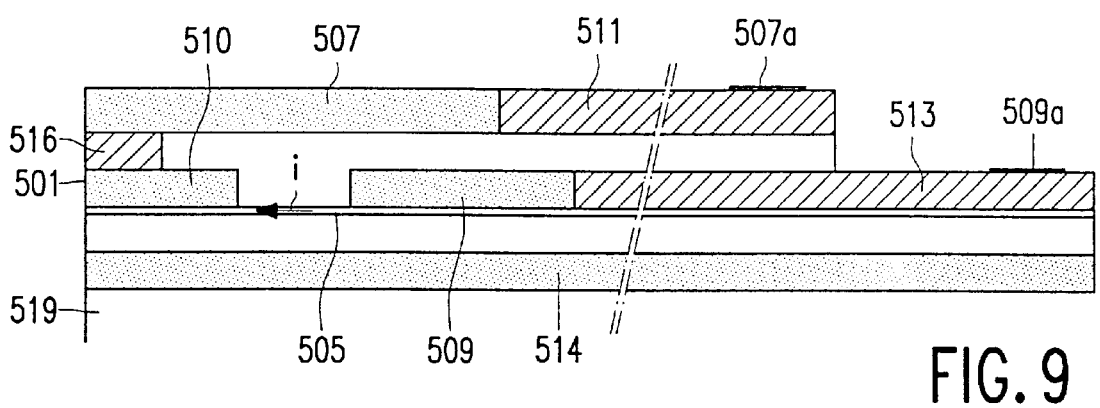
FIG. 9 is a diagrammatic cross-section of a sixth embodiment.

The single-channel magnetic head according to the invention, shown in FIG. 9, has a head face 501 and a non-magnetic substrate 519 which is provided with a thin-film structure comprising a magnetically permeable layer 514 of, for example NiFe, CoNBZr or FeTa—N, a magnetoresistive measuring element 505, two spaced magnetically permeable layers, i.e. in the terminology of this description, a second magnetic element 509 and a third magnetic element 510, and comprises a further magnetically permeable layer, i.e. a first magnetic element 507 in the terminology used. The magnetic elements 507 and 509 each have an electric connection face 507a, 509apresent on an electrically conducting layer 511, 513, respectively. An electrically conducting, non-magnetic gap layer 516 electrically interconnects the magnetic elements 507 and 510, while the measuring element 505 interconnects the magnetic element 510 and the magnetic element 509 so that, during operation, a current flows through the measuring element 505 in a direction i transverse to the head face 501. In this embodiment, all of the magnetic elements 507, 509 and 510 are current-conveying flux guides during operation, while the magnetically permeable layer 514 constitutes a shield against long magnetic waves.

Figure 10:
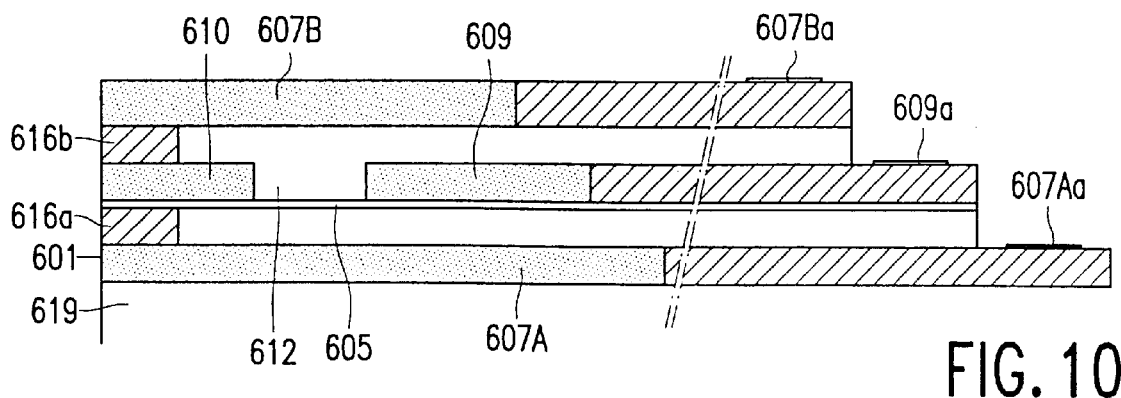
FIG. 10 is a diagrammatic cross-section of a seventh embodiment.

The variant shown in FIG. 10 has a head face 601 and a non-magnetic substrate 619 provided with a multilayer structure and a magnetoresistive measuring element 605, a first magnetic element formed from two electrically conducting, magnetically permeable layers 607A and 607B, a second magnetic element formed from an electrically conducting, magnetically permeable layer 609, and a third magnetic element formed from an electrically conducting, magnetically permeable layer 610. The measuring element 605 electrically and mechanically bridges a non-electric, non-magnetic space 612 between the second magnetic element 609 and the third magnetic element 610. Proximate to the head face 601, the third magnetic element 610 is electrically connected to the layers 607A and 607B by means of two electrically conducting layers 616a and 616b, respectively. The second magnetic element 609, as well as the layers 607A and 607B have electric connection faces 609a, 607Aa and 607Bb, respectively.

A current which is equal to the sum of the currents through the layers 607A and 607B of the first magnetic element flows through the measuring element 605 in the electric circuit used in the magnetic head shown in FIG. 10, the current direction in the measuring element 605 being transverse to the head face 601. The layers 607A and 607B have a shielding effect against long magnetic waves; related thereto, this magnetic head, likewise as the magnetic heads shown in FIGS. 1 and 9, has a substantially spatially differentiating effect as compared with the embodiments shown in FIGS. 3, 5, 7 and 8.

It is to be noted that embodiments different from those shown are alternatively possible within the scope of the invention. For example, the magnetic head according to the invention may form part of a combined read/write magnetic head unit. Moreover, in contrast to what is shown in the embodiments in which the effective width of the measuring element, i.e. the width in the second direction in which the measuring element is actually active as a sensor, is equal to the geometrical width of the measuring element, the actual width of the measuring element may be larger than the effective width. This may be the case, for example, if bias layers of, for example a hard-magnetic or an antiferromagnetic material are present at the ends of the measuring element, as viewed in the second direction. Furthermore, magnetic heads in a practical embodiment are generally provided with a counter block to protect the multilayer structure.

Figure 11:
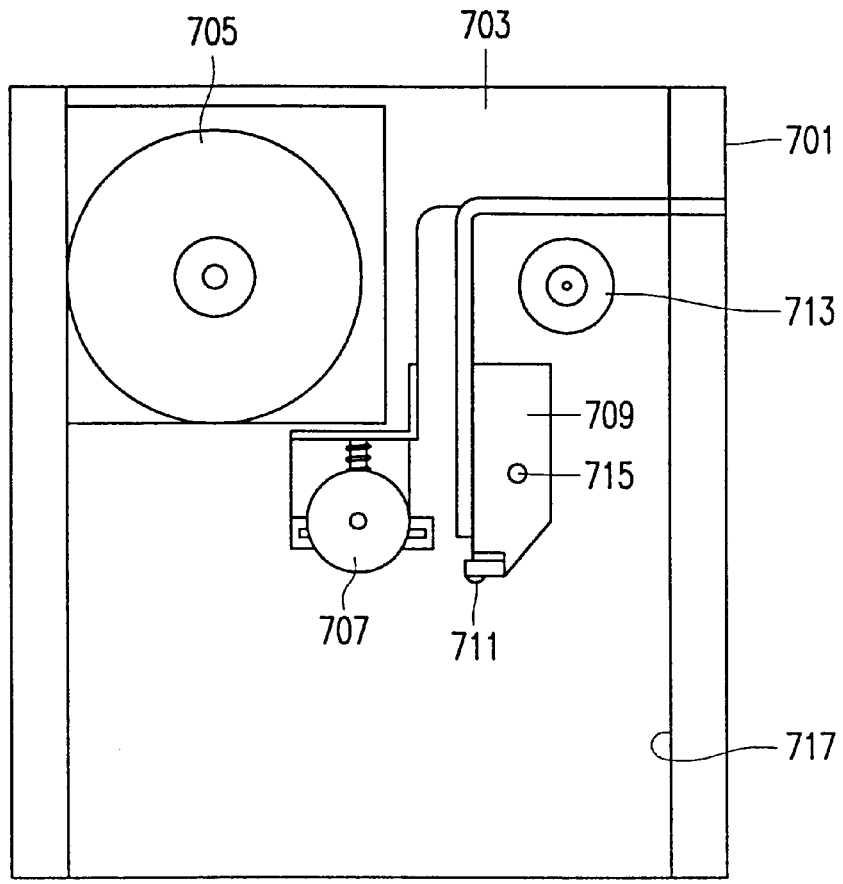
FIG. 11 shows diagrammatically an embodiment of the device according to the invention.
Figure 12:
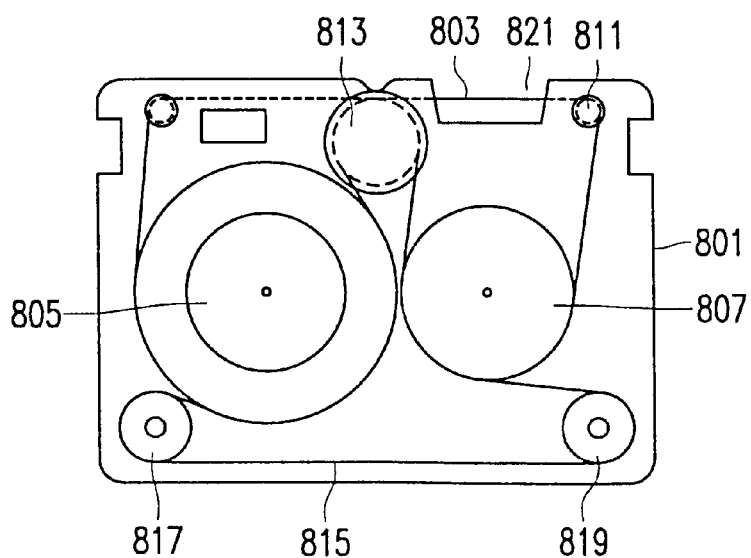
FIG. 12 shows diagrammatically an embodiment of a magnetic tape cassette suitable for cooperation with the device shown.

The device according to the invention, shown in FIG. 11, is suitable for writing and/or reading a magnetic tape 803 which, in this embodiment, is present in the cassette 801 shown in FIG. 12. The device has a housing 701 with a frame 703. The housing 701 accommodates, inter alia, a drive motor 705 for driving a drive roll 707 and a single-channel magnetic head 711 according to the invention, which, in this embodiment, is secured to a sub-frame 709 which is movable along a guiding shaft 715 by means of a drive motor 713. The device also has a straight guiding member 717 for sliding the cassette 801 into and out of the housing 701. The cassette 801 may be used, for example, for storing information in a digital form. The cassette has two reels 805 and 807 on which a part of the magnetic tape 803 is present. The part of the magnetic tape 803 present between the two reels is guided along two tape-guiding members 809 and 811 which are stationary in this embodiment and runs along a capstan 813. The cassette 801 includes an endless drive belt 815 which runs along the capstan 813, the reels 805 and 807 and two belt-guiding members 817 and 819. In an operating state, in which the cassette 801 cooperates with the device 701 according to the invention, the magnetic head 711 projects into a recess 821 in the cassette and is then in contact with the magnetic tape 803. Simultaneously, the drive roll 707 is in contact with the capstan 813 via which the magnetic tape 803 is longitudinally movable from one reel to the other.

The device shown is a data storage device and may be, for example an audio and/or video apparatus. The device may also be adapted in such a way that the record carrier is a magnetic disc or a magnetic card instead of a magnetic tape.

I claim:

1. A single-channel magnetic head having a head face which extends in a first direction in which a magnetic record carrier is relatively movable with respect to the magnetic head, and in a second direction transverse to the first direction, and having a structure of layers which, viewed in the first direction, are situated one on top of the other and extend substantially in the second direction and a third direction transverse to the first and the second directions, said structure being provided with a magnetoresistive measuring element having an effective width extending in the second direction, a first magnetic element and a second magnetic element, viewed in the first direction, said magnetic elements being situated in an at least partially overlapping relationship, at least the first magnetic element of said elements extending as far as the head face and both magnetic elements being electrically conducting, the measuring element being arranged electrically in series between the two magnetic elements for passing a measuring current through the measuring element substantially in the third direction, and each magnetic element having an electric connection face, characterized in that the magnetic element extending as far as the head face has an extensiveness which is larger in the second direction than in the third direction, said extensiveness in the second direction being larger than the effective width of the measuring element, and the magnetic element extending as far as the head face has a relative magnetic permeability which is larger in the third direction than in the second direction.

2. A magnetic head as claimed in claim 1, characterized in that the extensiveness of the magnetic element extending as far as the head face is at least twice larger in the second direction than in the third direction.

3. A magnetic head as claimed in claim 2, characterized in that the relative magnetic permeability in the third direction is at least a factor of 25 larger than the relative magnetic permeability in the second direction.

4. A magnetic head as claimed in claim 2, characterized in that the head comprises:

an electrically conducting third magnetic element extending as far as the head face, which, jointly with the second magnetic element not extending as far as the head face, bounds a non-magnetic space which is bridged by the magnetoresistive measuring element, the magnetoresistive measuring element being in electrical contact with the second and the third magnetic element at locations adjacent said space, and an electrically conducting gap layer electrically interconnecting the first magnetic element and the third magnetic element extending proximate to the head face.

5. A magnetic head as claimed in claim 2, characterized in that the magnetoresistive measuring element as well as the second magnetic element extend as far as the head face, while a part of the measuring element situated proximate to the head face is in electrical contact with one of the first magnetic element or the second magnetic element, and a part of the measuring element spaced apart from the head face is in electrical contact with the other one of said magnetic elements.

6. A magnetic head as claimed in claim 2, characterized in that the connection faces of the first and second magnetic elements are situated within a zone having an extensiveness in the second direction which is determined by the extensiveness in the second direction of the magnetic element extending as far as the head face.

7. A magnetic head as claimed in claim 2, characterized in that the connection faces of the first and second magnetic elements are situated on the respective magnetic elements.

8. A magnetic head as claimed in claim 1, characterized in that the relative magnetic permeability in the third direction is at least a factor of 25 larger than the relative magnetic permeability in the second direction.

9. A magnetic head as claimed in claim 1, characterized in that the head comprises:

an electrically conducting third magnetic element extending as far as the head face, which, jointly with the second magnetic element not extending as far as the head face, bounds a non-magnetic space which is bridged by the magnetoresistive measuring element, the magnetoresistive measuring element being in electrical contact with the second and the third magnetic element at locations adjacent said space, and an electrically conducting gap layer electrically interconnecting the first magnetic element and the third magnetic element extending proximate to the head face.

10. A magnetic head as claimed in claim 1, characterized in that the magnetoresistive measuring element as well as the second magnetic element extend as far as the head face, while a part of the measuring element situated proximate to the head face is in electric contact with the first magnetic element or the second magnetic element, and a part of the measuring element spaced apart from the head face is in electric contact with the other one of said magnetic elements.

11. A magnetic head as claimed in claim 1, characterized in that the connection faces of the first and second magnetic elements are situated within a zone having an extensiveness in the second direction which is determined by the extensiveness in the second direction of the magnetic element extending as far as the head face.

12. A magnetic head as claimed in claim 1, characterized in that the connection faces of the first and second magnetic elements are situated on the respective magnetic elements.

13. A device for scanning a magnetic record carrier, including the single-channel magnetic head as claimed in claim 1.

* * * * *